(12) United States Patent
Giaimo et al.

(10) Patent No.: US 7,983,222 B2
(45) Date of Patent: Jul. 19, 2011

(54) WIRELESS CHANNEL SELECTION TECHNIQUES AND DEVICES

(75) Inventors: Edward Giaimo, Bellevue, WA (US); Matthew Jubelirer, San Diego, CA (US); Matthew Morris, Seattle, WA (US); Curtis McClive, Kirkland, WA (US); Loren Reas, Kent, WA (US); Wayne King, Floreat (AU); Mark Edward Smalley, Kardinya (AU)

(73) Assignee: Microsoft Corporation, Redmond, WA (US)

( * ) Notice: Subject to any disclaimer, the term of this patent is extended or adjusted under 35 U.S.C. 154(b) by 287 days.

(21) Appl. No.: 11/899,761

(22) Filed: Sep. 7, 2007

(65) Prior Publication Data

US 2009/0067447 A1    Mar. 12, 2009

(51) Int. Cl.
*H04W 4/00* (2009.01)
*H03C 1/62* (2006.01)
*H04B 17/00* (2006.01)
*H04B 1/18* (2006.01)

(52) U.S. Cl. .................. 370/332; 455/115.1; 455/161.3

(58) Field of Classification Search .................. 370/310, 370/329, 331, 332, 333, 341; 455/464, 509, 455/513, 516
See application file for complete search history.

(56) References Cited

U.S. PATENT DOCUMENTS

| | | | | | |
|---|---|---|---|---|---|
| 5,418,839 A | * | 5/1995 | Knuth et al. | | 455/464 |
| 5,471,671 A | * | 11/1995 | Wang et al. | | 455/226.2 |
| 5,687,197 A | * | 11/1997 | Powell et al. | | 375/347 |
| 5,822,686 A | * | 10/1998 | Lundberg et al. | | 455/161.3 |
| 5,889,768 A | * | 3/1999 | Storm et al. | | 370/320 |
| 6,112,098 A | * | 8/2000 | Flint et al. | | 455/464 |
| 6,973,059 B1 | * | 12/2005 | Borst et al. | | 370/330 |
| 7,406,116 B2 | * | 7/2008 | Agrawala et al. | | 375/213 |
| 2004/0203436 A1 | * | 10/2004 | Oesterling | | 455/67.11 |
| 2005/0170801 A1 | * | 8/2005 | Deolalikar et al. | | 455/226.1 |
| 2005/0181799 A1 | * | 8/2005 | Laroia et al. | | 455/450 |
| 2006/0120324 A1 | * | 6/2006 | Cho et al. | | 370/329 |
| 2006/0171357 A1 | * | 8/2006 | King et al. | | 370/331 |
| 2007/0142055 A1 | * | 6/2007 | Toivanen et al. | | 455/450 |
| 2009/0028098 A1 | * | 1/2009 | Gates et al. | | 370/329 |
| 2009/0059814 A1 | * | 3/2009 | Nixon et al. | | 370/254 |

OTHER PUBLICATIONS

International Search Report and Written Opinion Received for PCT Application No. PCT/US2008/075190, mailed on Mar. 17, 2009, 10 pages.

* cited by examiner

*Primary Examiner* — Xavier Szewai Wong
(74) *Attorney, Agent, or Firm* — Turk IP Law, LLC (57) ABSTRACT

Techniques for locating wireless channels usable for transmitting media signals from personal media players that are adequately separated from wireless channels used for other purposes. One technique involves identifying a target channel and at least two additional channels within a certain proximity of the target channel, and evaluating a channel usability algorithm based on characteristics, such as the received signal strengths, of the target channel and the received signal strengths of each of the proximate channels. Based on evaluation of the algorithm, the target channel is deemed either usable or not usable to transmit the media signal. The most desirable available target channel(s) in a particular group or sub-group of wireless channels may also be identified.

14 Claims, 4 Drawing Sheets

WIRELESS CHANNEL SELECTION TECHNIQUES AND DEVICES

BACKGROUND

Many personal media players use headphones, ear buds, or the like to provide media signals (for example, audio signals) to a single listener. In some situations, however, it is desirable to transmit the output of a personal media player over-the-air.

Devices and techniques exist that receive input from a personal media player and transmit media signals from the personal media player via a wireless channel to a receiver/over-the-air media player, such as an FM radio, in close proximity to the device. Generally, such devices and techniques transmit the media signals via unused wireless channels, on which there is a limited amount of measured interference. The devices and techniques often fail to recognize, however, that the unused wireless channels selected for transmitting media signals may be near other wireless channels that are used to transmit signals strong enough to interfere with media signals transmitted via the unused wireless channels.

SUMMARY

Techniques for locating wireless channels usable for transmitting media signals from personal media players are discussed herein. Generally, the most desirable wireless channels for transmitting media signals are adequately separated from wireless channels used for other purposes.

In accordance with one technique, aspects of which may be performed within electronic devices such as personal media players, stand-alone wireless transmitter or receiver devices, in-vehicle or in-home media players, or any other devices now known or later developed, a range of wireless channels is automatically or manually searched to identify one or more usable wireless channels. A particular target wireless channel is identified, along with at least two additional wireless channels within a certain proximity of the target wireless channel. A channel usability algorithm is used to determine whether the target wireless channel is usable to transmit the media signal. The algorithm evaluates characteristics, such as received signal strengths or other characteristics, of signals received via the target wireless channel and each of the proximate channels.

In one implementation, the target wireless channel is deemed to be usable when its received signal strength is below a certain threshold, and when the received signal strengths of the proximate wireless channels are below another threshold (in practice, the thresholds may be the same or different). In another implementation, a score is calculated based on the received signal strengths of the target channel and the proximate wireless channels, and the target wireless channel is deemed to be usable when the score is below an established threshold. One possible score calculation is obtained by multiplying the received signal strength of the target channel by a weighting factor, then adding the result to the sum of the individual received signal strengths of the proximate wireless channels. It is further possible to locate the best available target channel from among a number of potentially usable target channels, and/or to rank or otherwise organize a number of potentially usable, or unusable, target channels.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

DETAILED DESCRIPTION

Wireless channels that are usable for transmitting media signals from personal media players, such as FM radio stations and other radio frequency channels having relatively static frequency allocations, may not be adequately separated from wireless channels used for other purposes. Techniques discussed herein enable the identification of wireless channels that would be candidates for transmitting media signals from personal media players via the use of a channel usability algorithm that considers not only the characteristics (such as the received signal strength) of the wireless channel that would be used for transmitting the media signals, but also the characteristics (such as the received signal strengths) of at least two other proximate wireless channels.

Figure 1:
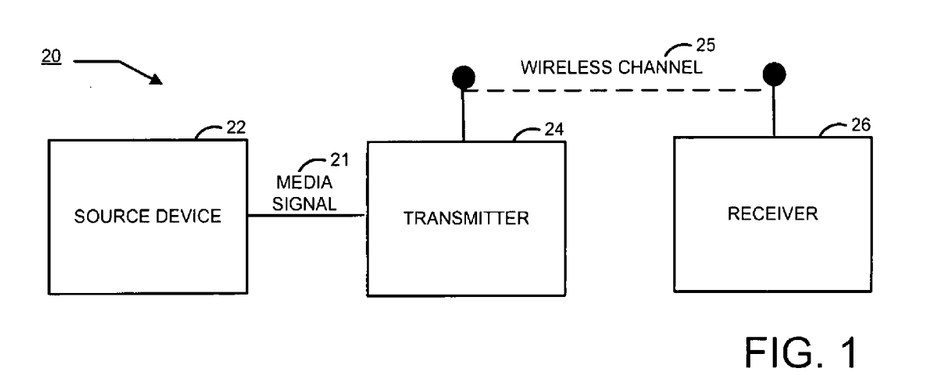
FIG. 1 is a simplified block diagram of an exemplary system having a source device, a transmitter, and a receiver, aspects of which may implement or use methods or techniques for selecting wireless channels for transmitting media signals.

Turning now to the drawings, where like numerals designate like components, FIG. 1 is a simplified block diagram of a system 20 having a source device 22, a transmitter 24, and a receiver 26. Source device 22 may be any type of personal media player known or later developed, such as an MP3 player, a personal computer, a mobile phone, a CD player, a DVD player, a digital camera, a set-top box, a personal digital assistant, a media center, or any combination thereof, which is configured to produce a media signal 21 such as an audio signal, a video signal, or a multimedia signal.

Receiver 26 is any type of device capable of receiving media signal 21 via a wireless channel 25 and causing media signal 21 to be played over-the-air. Wireless channel 25 is generally a radio frequency channel of a channelized frequency band, including but not limited to a frequency modulated radio station channel, a satellite radio channel, a cellular phone channel, a satellite television channel, a cable television channel, an over-the-air television channel, or a wireless local-area-network channel. Examples of receiver 26 include but are not limited to in-vehicle or in-home media players such as FM radios, satellite radios, televisions, stereos, set-top boxes, personal computers, media centers, and the like. For purposes of discussion and not limitation, wireless channel 25 may be referred to herein as an FM radio station, or simply a station, and the channelized frequency band may be referred to herein as all or a portion of the FM radio frequency band.

Transmitter 24 is in communication with source device 22 to receive media signal 21 and to transmit the media signal to receiver 26 via wireless channel 25. Transmitter 24 may be any type of device capable of receiving media signal 21 and transmitting media signal 21 via wireless channel 25. Examples of transmitter 24 include but are not limited to stand-alone FM transmitter devices, mobile phones, personal media players having integrated transmitters, PDAs, and the like.

Figure 2:
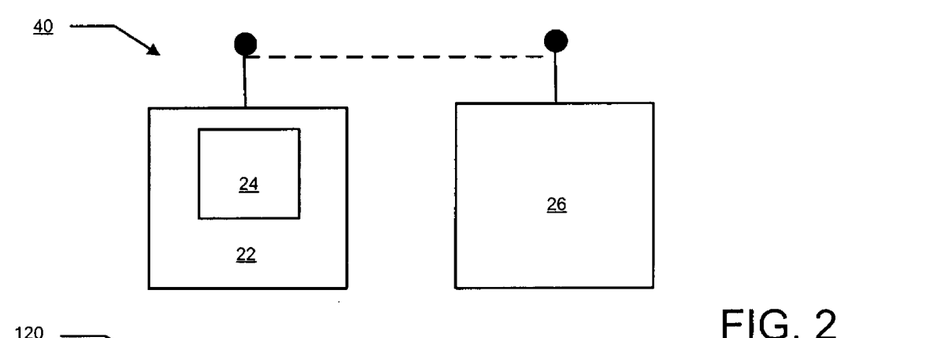
FIG. 2 is a simplified block diagram of another exemplary system having a source device, a transmitter, and a receiver, aspects of which may implement or use methods or techniques for selecting wireless channels for transmitting media signals.
Figure 3:
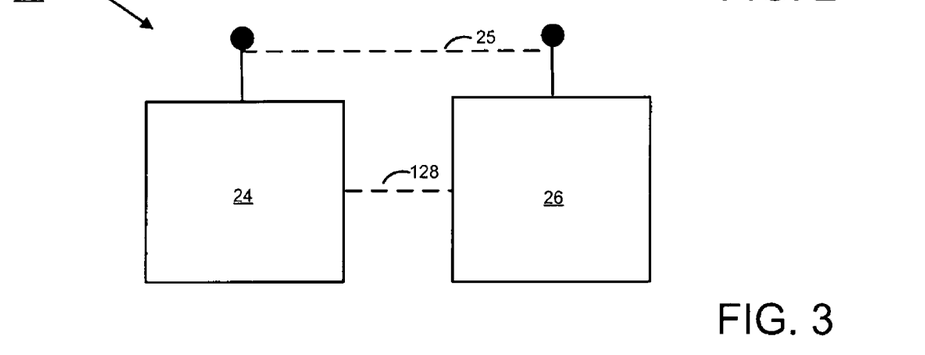
FIG. 3 is a simplified block diagram of yet another exemplary system having a source device, a transmitter, and a receiver, aspects of which may implement or use methods or techniques for selecting wireless channels for transmitting media signals.

It will be appreciated that functional components of system 20 may be implemented by one or more devices, which are co-located or remotely located, in a variety of ways. FIGS. 2 and 3 illustrate alternative exemplary implementations of systems having alternatively configured transmitter, receiver, and source components.

FIG. 2 is a simplified block diagram of a system 40 having a transmitter 24 that is integrated into a source device 22'. The integrated unit transmits the media signal via wireless channel 25 to receiver 26.

FIG. 3 is a simplified block diagram of a system 120 having a transmitter 24 that causes a receiver 26 to automatically tune to a selected wireless channel 125 via signal 128. Transmitter 24 is also in communication with, or included in, a source device (not shown) similar to source device 22 shown in FIGS. 1 and 2. In one possible scenario, signal 128 represents a control signal sent via a wired connection between transmitter 24 and receiver 26. In another scenario, signal 128 represents a control signal sent via a wireless connection between transmitter 24 and receiver 26 (via wireless channel 25 or another wireless connection, such as a wireless local-area-network connection—WiFi or Bluetooth, for example).

Generally, wireless channel 25 that is used for transmitting media signal 21 from a particular transmitter to a particular receiver is selected (by the transmitter, the receiver, or some other device or component that implements or uses the components and/or wireless channel selection techniques discussed herein) by sampling a range of wireless channels, such as stations in the FM radio frequency band, and selecting a station having certain characteristics. One characteristic is that the station has an amount of signal energy from other sources less than a predetermined threshold or limit. Received signal strength indication ("RSSI") measurements, or any other desired signal energy/strength measurements may be used to ascertain the amount of signal energy associated with a particular wireless channel. Devices and techniques configured to select wireless channels having low measured RSSI, however, often fail to recognize that such channels may be near other wireless channels that are used to transmit signals strong enough to interfere with media signals transmitted via the selected wireless channels.

Figure 4:
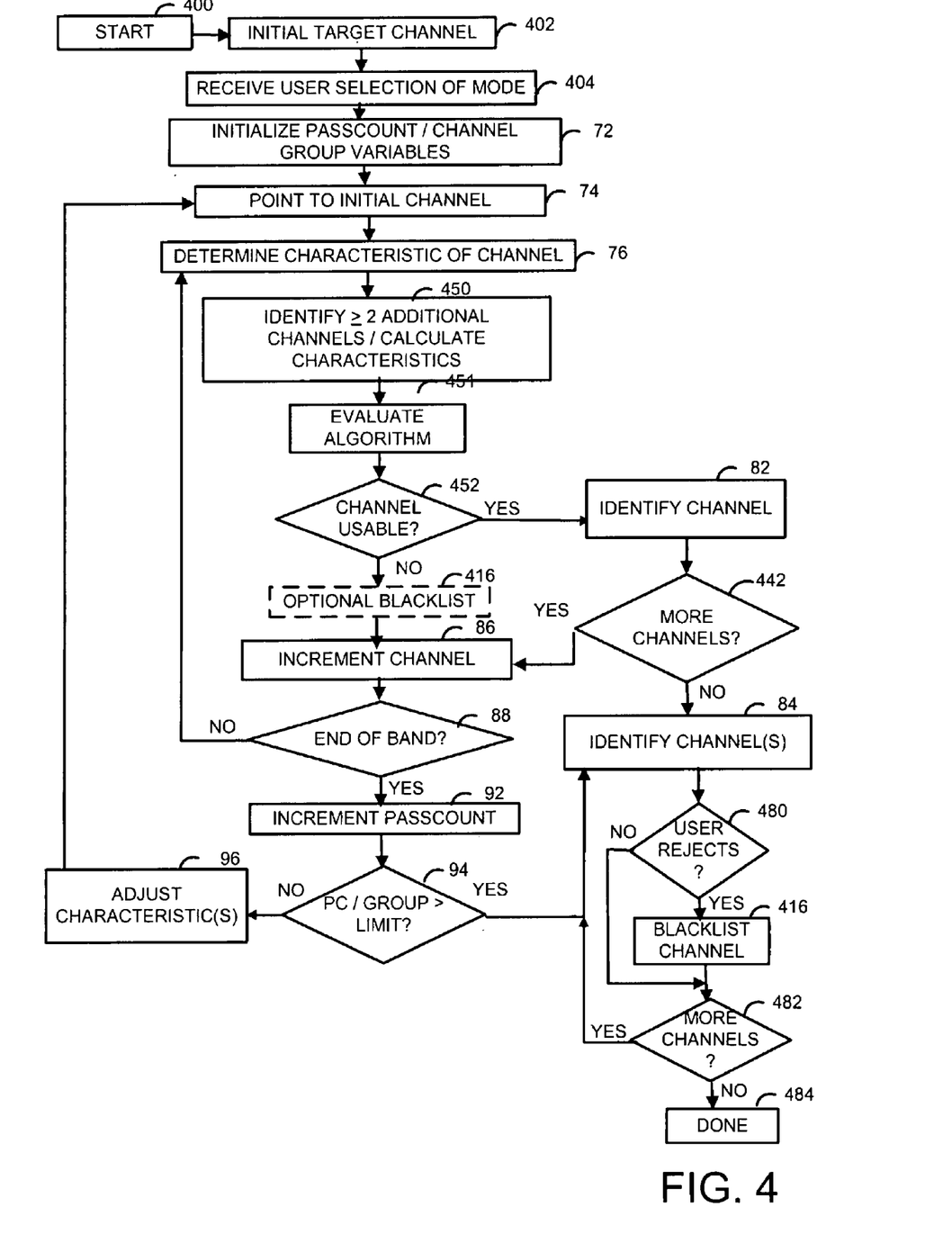
FIG. 4 is a flowchart of a method for selecting wireless channels for transmitting media signals.

With continuing reference to FIGS. 1-3, FIG. 4 is a flowchart of a method for selecting usable wireless channel(s) for transmitting media signals. The most usable wireless channel(s) for transmitting media signals are generally those channels separated in frequency from other wireless channels that are used to transmit relatively strong signals, because the strength of a signal on a channel in close proximity to a wireless channel transmitting media signals is inversely proportional to the ability of the receiver of the wireless channel to reject the signal on the proximate channel. The method(s) illustrated in FIG. 4 may be implemented using computer-executable instructions executed by one or more general, multi-purpose, or single-purpose processors (exemplary computer-executable instructions 606 and processor 602 are discussed further below, in connection with FIG. 6). Unless specifically stated, the methods described herein are not constrained to a particular order or sequence. In addition, some of the described methods or elements thereof can occur or be performed concurrently. It will be understood that all of the steps shown need not occur in performance of the functions described herein. Although aspects of the method of FIG. 4 are discussed with reference to wireless channels comprising stations in the FM radio frequency band, it will be understood that wireless channels may be any radio frequency channels of any channelized frequency band.

The method begins at block 400, and continues at block 402, where an initial target wireless channel is identified. In one possible implementation, the initial target wireless channel is the last channel used by a user for transmitting media signals. Any desired criteria, however, may be used to identify the initial target wireless channel. Next, at block 402, the mode of operation selected by the user is ascertained. It will be appreciated that acts associated with ascertaining the mode of operation desired by a user may occur at various points, but that the initial operating mode selected by the user is discussed for exemplary purposes. For example, the user may indicate, via user-actuated controls such as buttons or other controls, or via pre-set preferences or other means, whether the user desires to: manually step through and tune to usable wireless channels or to automatically scan for and tune to usable wireless channels (randomly, sequentially, or based on other traversal rules); locate the best usable wireless channel or any usable wireless channel; locate the first best (or first usable) channel or multiple best (or multiple best/usable) channels; and/or whether the user desires to select or tune to wireless channels according to other criteria (such as frequency sub-band location, most-frequently-used channel(s), etc.)

At block 72, passcount and/or channel group variables are initialized (for example, to one or other values). One or more passcount variables and/or channel group variables are generally used to keep track of how many iterations through a particular group of wireless channels have been performed, and/or to keep track of whether a particular sub-group of wireless channels has been scanned. In one possible implementation, two or more passes over a particular group (or groups) of wireless channels is performed to attempt to find a usable wireless channel, with different (generally higher) threshold signal strength values or other characteristics being used for each subsequent pass. In another implementation, a single pass is used. In another possible implementation, incrementing a channel group variable causes the next sub-group of wireless channels to be scanned. In the context of groups of wireless channels within the FM radio frequency band, it is possible to divide the entire band into a number (for example, five) of sub-bands, and to traverse the sub-bands in a particular direction to track the current and next sub-bands to be evaluated. The channel group variable would be incremented or decremented after the wireless channels in each sub-band are evaluated, depending on the direction of traversal of the FM radio frequency band (which may be based on user preference or input).

At block 74, a channel pointer is set to the initial target channel identified at block 402. The channel wireless channel pointed-to by the channel pointer is generally the wireless channel currently being evaluated for usability for transmitting media signal 21. As described below, the channel pointer maybe be used to iterate through a particular group of wireless channels (for example, a particular frequency band or sub-band(s)) to find one or more usable wireless channels for transmitting media signal 21. In one possible implementation, each incrementing (or decrementing) of the channel pointer (see block 86, discussed further below) selects another wireless channel at a higher (or lower) frequency. Other implementations are possible, however, and incrementing the channel pointer may select the next wireless channel in any desired manner or location.

At block 76, a characteristic of a signal received via the wireless channel pointed-to by the channel pointer is determined. Then, at block 450, at least two additional wireless channels within a predetermined proximity of the wireless channel pointed-to by the channel pointer are identified, along with characteristics of signals received via the proximate wireless channels. The number of additional wireless channels identified is a matter of design choice, which may be influenced by the channelization scheme associated with the wireless channels, receiver characteristics, and/or environmental conditions. For in-vehicle FM radio receivers, for example, two additional wireless channels may be sufficient, while for in-home FM radio receivers or receivers in geographic areas with tight channel spacing, four additional wireless channels may be desirable. In one possible implementation, proximity is defined to be a number of spaced frequencies of channels above and below the currently pointed-to wireless channel. It will be appreciated, however, that proximity may be defined in any desired manner.

Any one of a number of different signal strength determinations, calculations, or measurements may constitute the characteristics measured at blocks 76 and 450. For example, an RSSI measurement of the ambient signal strength of the wireless channels may be taken. One technique for measuring RSSI involves tuning to the wireless channel, reading the RSSI one or more times, and keeping the maximum or minimum RSSI value. Alternatively, the amplitude of a measured signal strength may be squared, or an RMS calculation may be performed. In some instances, the characteristic may not be a measurement of the signal energy at all—one such exemplary characteristic is a measurement or estimation of signal peaks or valleys.

Next, as indicated at block 451, a channel usability algorithm is evaluated, and at diamond 452, it is determined whether the evaluation of the algorithm resulted in the pointed-to wireless channel being deemed to be usable or unusable. The channel usability algorithm evaluates characteristics, such received signal strengths or other characteristics, of signals received via the target wireless channel and each of the identified proximate channels. Generally, a usable channel does not have too much undesirable interference to a user listening to media signal 21 (for example, the usable channel and proximate channels have appropriately low ambient signal strengths). Channel usability criteria may be set by empirically determining signal characteristics that provide desirable performance, and may be predetermined or dynamically determined (for example, based on current or historical operating conditions). For example, when ambient signal strength criteria are used at block 451, the usability criteria used at diamond 452 may be one or more threshold values. Such thresholds may be adaptable, based on the lowest or lowest average ambient RSSI in a particular sub-band of the radio frequency band.

In one exemplary implementation, the channel usability algorithm compares the received signal strength measured on the pointed-to wireless channel to a predetermined or dynamically determined threshold, and compares the received signal strengths measured on the additional channels proximate to the pointed-to wireless channel to another predetermined or dynamically determined threshold. In practice, the thresholds may be the same or different, and as the number of proximate channels increases, additional thresholds may be used. One exemplary manner of setting the threshold against which the received signal strengths measured on the additional channels proximate to the pointed-to wireless channel are compared is to set the threshold to a value that compensates for variability of radio receiver sensitivity and geographic locality by scaling the maximum, average, or root-mean-square average values of previously measured received signal strengths on neighboring channels (for example, measurements taken in a test or initial scan). In the exemplary implementation, the pointed-to wireless channel is deemed to be usable when its received signal strength measurement is below the first established threshold, and when the received signal strengths of each of the proximate wireless channels are below the second established threshold. The algorithm may make use of various weighting or scaling factors to further refine its application.

In another exemplary implementation, the channel usability algorithm is used to calculate a score based on the received signal strengths of the pointed-to wireless channel and the proximate wireless channels, and the pointed-to wireless channel is deemed to be usable when the score is below an established threshold (which may be predetermined or determined with reference to dynamic parameters, such as the score of the previously pointed-to wireless channel or other parameters). One possible score calculation is obtained by multiplying the received signal strength of the pointed-to wireless channel by a weighting factor, then adding the result to the sum of the individual received signal strengths of the proximate wireless channels.

When the pointed-to wireless channel is deemed to be usable at diamond 452, then the wireless channel is identified at block 82. Computer-readable media 604, discussed further below in connection with FIG. 6, may be used to store information about the wireless channel.

When, as indicated at diamond 442, the user desires only to locate a single wireless channel (for example, the first, nth, or first-/one-per-subgroup, etc.)—such as when the user is stepping through potential channels or groups of channels—the wireless channel is identified at block 84. Identification may include, but is not limited to, displaying information about the channel to a user for manual tuning of a receiver/over-the-air player, automatically passing information about the channel to the receiver/over-the-air player, and/or otherwise selecting or storing information about the wireless channel. Computer-readable media 604 may be used to store information about the wireless channel. As indicated at diamond 480, the user has an option to reject an identified channel. A user-rejected channel is placed on a "blacklist," as indicated at block 416. A blacklist is a list or other data structure for storing information about wireless channels deemed to be unusable for any reason. Conditions may be established using temporal parameters, geographic parameters, and the like, to ensure that wireless channels on the blacklist are not automatically re-evaluated and/or presented to a user within a predetermined time period, frequency band pass, or within a predetermined geographic location, and the like. In one exemplary implementation, if the same channel band is subsequently scanned under certain temporal conditions, channels in the blacklist are not presented to the user, resulting in a new set of channel choices for the user. Channels may be removed from the blacklist after a period of time, or based on other information or techniques, such as removal of channels within a finite last-in-first-out buffer—when the buffer is full the next blacklisted channel forces the last-in channel out of the buffer. After the user makes a decision regarding whether to blacklist an identified channel, then the process returns to block 84 if there are more channels to identify as indicated at diamond 482, and is complete when there are no more channels to identify, as indicated at block 484.

If, however, at diamond 442 it is desired to locate more wireless channels (for example, all of the usable channels, or a best wireless channel from among a number of usable channels (the best wireless channel overall or within a particular group of wireless channels), or if it is determined at diamond 452 that the pointed-to wireless channel is unusable, then the method proceeds to block 86, where the channel pointer is incremented to the next potential wireless channel to be evaluated. An optional step of placing a wireless channel on the, as shown at block 416, may be performed when at diamond 452 the wireless channel was deemed to be unusable. It will be appreciated, however, that channels deemed to be unusable based on the channel usability algorithm may not be placed on the same blacklist as channels rejected by the user. It is also possible to present information about unusable wireless channels (such as measured channel characteristics) to a user.

Assuming the next wireless channel to be evaluated identified at block 86 is within the range of the group of wireless channels being tested on the current pass, the method repeats from step 76. It may be unnecessary to evaluate the next potential wireless channel, however, if it is currently on the blacklist, and the next potential wireless channel not on the blacklist may be identified. If the next potential wireless channel identified at block 86 happens to be outside the range of the group of wireless channels being evaluated, and if an additional pass through the group of wireless channels is desired, or if there is another group of wireless channels to be evaluated, then the channel pointer is returned to the initial channel (or the first (optionally, non-blacklisted) channel of the next group of wireless channels) at block 74. The acceptability criteria for channel usability characteristics may be adjusted, if desired, at block 96, to increase the chances that usable wireless channel(s) will be located. If an additional pass through of the group of wireless channels is not desired, and/or if the last group of wireless channels has been evaluated, then the method proceeds to block 84, where wireless channel(s) is/are identified at block 84. Identification may include, but is not limited to, displaying information about acceptable channel(s) (or the lack thereof) to the user, displaying to the user information about channels or characteristics measured, and/or automatically passing information about acceptable channel(s) to the receiver/over-the-air player. As indicated at diamond 480, the user has an option to reject an identified channel. A user-rejected channel is placed on a "blacklist," as indicated at block 416. A blacklist is a list or other data structure for storing information about wireless channels deemed to be unusable for any reason. Conditions may be established using temporal parameters, geographic parameters, and the like, to ensure that wireless channels on the blacklist are not automatically re-evaluated and/or presented to a user within a predetermined time period, frequency band pass, or within a predetermined geographic location, and the like. In one exemplary implementation, if the same channel band is subsequently scanned under certain temporal conditions, channels in the blacklist are not presented to the user, resulting in a new set of channel choices for the user. Channels may be removed from the blacklist after a period of time, or based on other information or techniques, such as removal of channels within a finite last-in-first-out buffer—when the buffer is full the next blacklisted channel forces the last-in channel out of the buffer. After the user makes a decision regarding whether to blacklist an identified channel, then the process returns to block 84 if there are more channels to identify as indicated at diamond 482, and is complete when there are no more channels to identify, as indicated at block 484.

When it is desirable to identify a most desirable, or best, wireless channel from among a number of usable channels, the wireless channel may be identified from among the wireless channels identified at block 84 (it will be understood that the user may still have the option to reject any identified channel, as discussed above). In one exemplary implementation, a most desirable wireless channel within a particular group of channels can be identified by calculating a weighted average of the signal strength values of each of the pointed-to wireless channels deemed to be usable at diamond 452, and their additional proximate wireless channels, and selecting the wireless channel having the smallest weighted average. One exemplary weighted average calculation can be expressed as 10*RSSI[pointed-to wireless channel]+MAX (RSSI[proximate wireless channel(s) below pointed-to wireless channel], RSSI[proximate wireless channel(s) above pointed-to wireless channel]). In another exemplary implementation, the scores described in connection with block 451 may be used to identify the best wireless channel—for example, the channel with the lowest score. The selection of a best wireless channel may be performed after an entire scan has been performed, or incrementally, with reference to each previously identified best wireless channel.

If it is desired to rank the usable wireless channels identified in a particular scan (for example, a scan of a particular sub-band, or the results of scans of multiple sub-bands), one manner of ranking the identified wireless channels is to locate a particular characteristic (for example, the RSSI value, weighted average of RSSI values, or score) associated with the best wireless channel overall, as described above, and same characteristic(s) associated with the "worst" usable wireless channel overall and use those values to locate the next-best wireless channel, etc., until the identified channels have been organized in ascending or descending order, by sub-band location, or any combination of desired criteria.

Generally, a wireless channel that is currently in use for transmitting media signals 21 is maintained unless and until the user affirmatively indicates a desire to change the wireless channel. It may be desirable, however, to automatically monitor characteristics of the currently used wireless channel to determine if adjustment to a new channel would be appropriate, and either performing or suggesting the adjustment.

Figure 5:
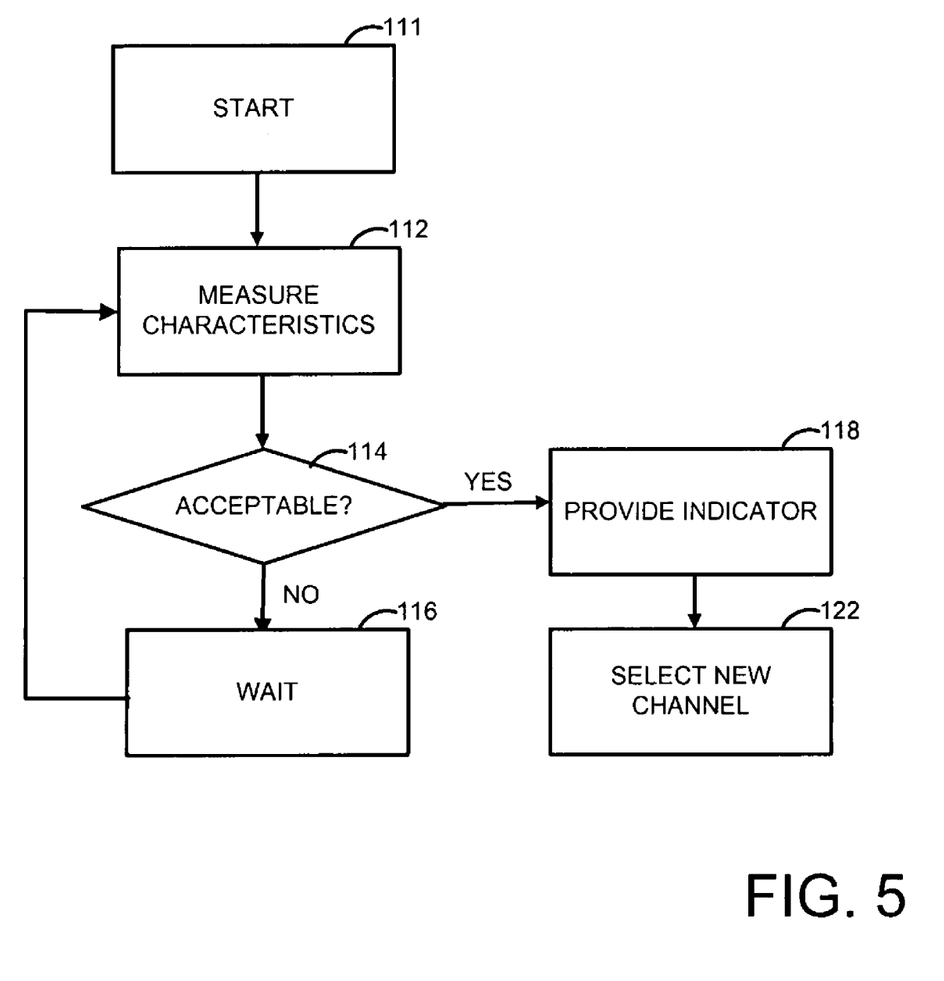
FIG. 5 is a flowchart of a method for monitoring characteristics of wireless channels for transmitting media signals.

FIG. 5 is a flowchart of a method for automatically monitoring characteristics, such as ambient signal strength, of a wireless channel in use for transmitting media signals 21. The method begins at block 111, and continues at block 112, where a characteristic (such as the current ambient signal strength) is measured. At diamond 114, it is determined if the result of the measurement at block 112 is acceptable (for example, exceeds or is under a certain threshold or limit). If not, then control transfers from diamond 114 to block 116, where the process waits. The amount of waiting time may vary according to a desired cycle time of the entire process. If it is determined at diamond 114 that the result of the measurement at block 112 does exceed the certain threshold or limit, then at block 118 an indication is provided to the user that the current wireless station is unusable, and a new channel may be automatically or manually selected (for example, using aspects of the method described in connection with FIG. 4) as indicated at block 122.

With continued reference to FIGS. 1-4, FIG. 5 is a block diagram of an exemplary configuration of an electronic device 600 in which all or part of the method(s) or techniques shown and discussed in connection with FIGS. 4 and 5 may be implemented or used. Electronic device 600 is generally indicative of a wide variety of general-purpose or special-purpose computing environments, and is not intended to suggest any limitation as to the scope of use or functionality of the system(s) and methods described herein. For example, electronic device 600 may be a type of portable or non-portable device such as a mobile phone, an FM transmitter, a personal media player, an in-vehicle media player, a personal computer, a digital camera, a home media player, a server, a digital video recorder, or a personal digital assistant.

Figure 6:
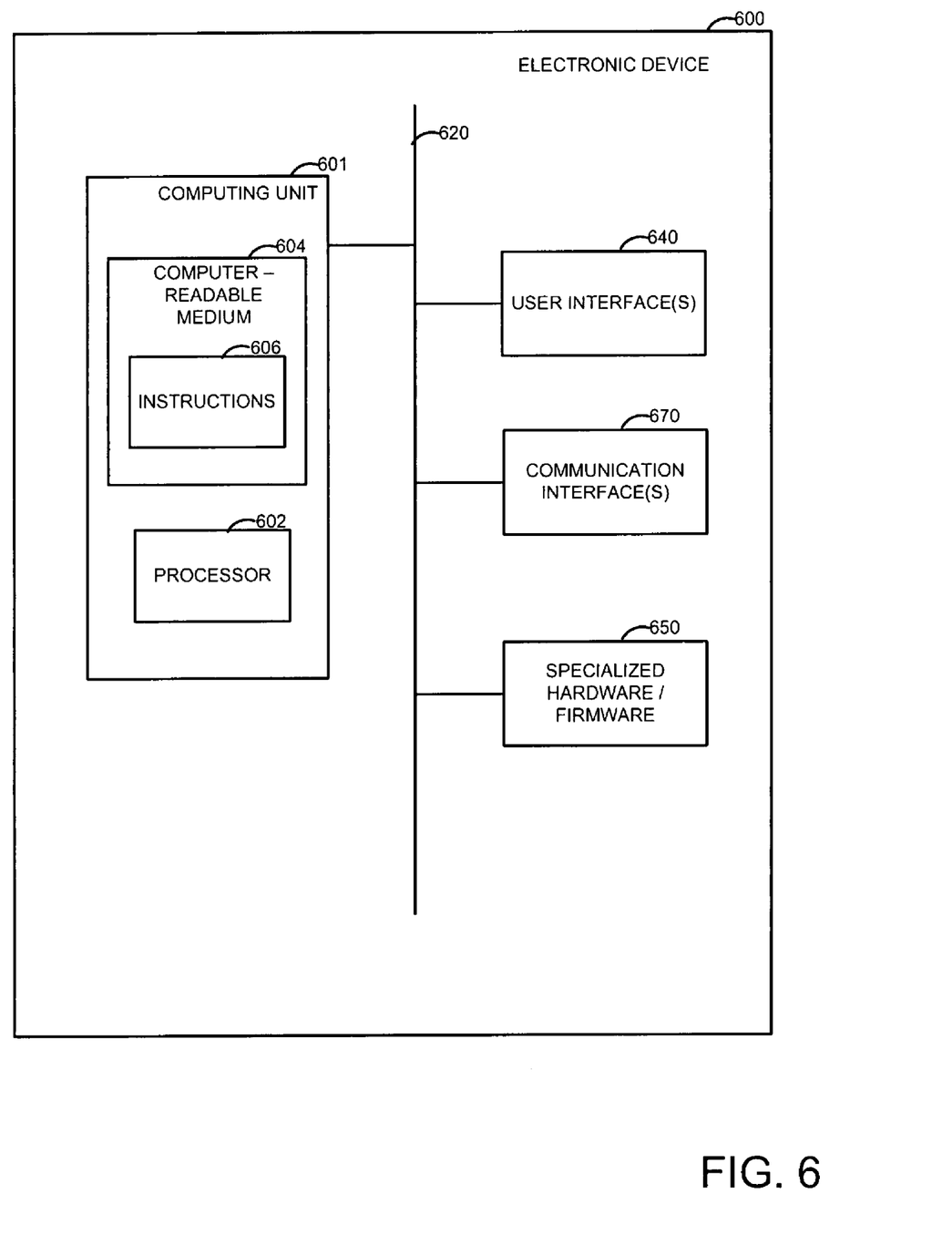
FIG. 6 is a simplified block diagram of an exemplary configuration of an electronic device, with which aspects of the methods shown in FIGS. 4 and 5 may be implemented or used.

As shown, electronic device 600 includes a computing unit 601, which further includes a processor 602, computer-readable media 604, and computer-executable instructions 606. One or more internal buses 620, which are widely available elements, may be used to carry data, addresses, control signals and other information within, to, or from electronic device 600 or elements thereof.

Processor 602, which may be a real or a virtual processor, controls functions of electronic device 600 by executing computer-executable instructions 606. Processor 602 may execute instructions 606 at the assembly, compiled, or machine-level to perform a particular process.

Computer-readable media 604 represent any number and combination of local or remote devices capable of recording, storing, or transmitting computer-readable data. In particular, computer-readable media 604 may be, or may include, a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof.

Computer-readable media 604 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 606 represent any signal processing methods or stored instructions. Generally, computer-executable instructions 606 are implemented as software components according to well-known practices for component-based software development, and encoded in computer-readable media (such as computer-readable media 604). Computer programs may be combined or distributed in various ways. Computer-executable instructions 606, however, are not limited to implementation by any specific embodiments of computer programs, and in other instances may be implemented by, or executed in, hardware, software, firmware, or any combination thereof.

Electronic device 600 further includes user interface(s) 640, which are physical or logical elements that facilitate receipt of user-actuated input to electronic device 600, and presentation of output to users. Input may be received using any type of now known or later-developed physical or logical elements, such as remote controls, buttons, displays, mice, pens, styluses, trackballs, keyboards, microphones, scanning devices, and all types of devices that are used input data. User interface(s) 640 may also include output interface(s), which are physical or logical elements that facilitate provisioning of output from electronic device 600. Output may be provided using any type of now known or later-developed physical or logical elements, such displays, printers, speakers, disk drives, and the like. In practical examples, user-actuated inputs may be used to make selections with respect to automatic or manual wireless channel selection, transmission, or reception. Outputs such as displays may be used to identify to a user the currently selected (or best usable, etc.) wireless channel, and/or to identify the personal media player from which media signal 21 originated. In the latter case, techniques such as RDS or other techniques may be used to communicate in-band or out-of-band information that is displayed to a user via a device such as receiver/over-the-air player 26.

Communication interface(s) 670 are one or more physical or logical elements that enable external communication by electronic device 600 via one or more protocols or techniques. Examples of communication interface(s) 670 include but are not limited to connectivity devices or computer-executable instructions. Information received at a given communication interface may traverse one or more of the several layers of a communication protocol stack or abstract networking model. One exemplary abstract networking model is the OSI Internetworking Model, which has seven layers: layer 1, the physical layer; layer 2, the data link layer; layer 3, the network layer; layer 4, the transport layer; layer 5, the session layer; layer 6, the presentation layer; and layer 7, the application layer.

Specialized hardware/firmware 650 represents any hardware or firmware that implements functions of electronic device 600. Examples of specialized communication hardware include transceivers (and/or individual transmitters or receivers), encoder/decoders ("CODECs"), decrypters, application-specific integrated circuits, clocks, and the like.

It will be appreciated that particular configurations of electronic device 600 may include fewer, more, or different components or functions than those described. In addition, functional components of electronic device 600 may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A non-transitory computer-readable storage medium encoded with computer-executable instructions which, when executed by a processor, perform a method for selecting a wireless channel for transmitting a media signal originating from a personal media player, the method comprising:
   automatically identifying a target wireless channel from among a number of wireless channels, wherein the number of wireless channels are non-blacklisted channels based on one of: a predetermined time period, a frequency band pass, and a predetermined geographic location;
   identifying at least two additional wireless channels within a predetermined proximity of the target wireless channel;
   receiving a signal via the target wireless channel;
   receiving signals via each of the at least two additional wireless channels;
   measuring a characteristic of the signal received via the target wireless channel;
   measuring characteristics of the signals received via each of the at least two additional wireless channels;
   evaluating a channel usability algorithm based on a measured characteristic of the signal received via the target wireless channel and measured characteristics of the signals received via each of the at least two additional wireless channels, whether the target wireless channel is deemed to be usable to transmit the media signal, wherein the channel usability algorithm compares the measured characteristics of the signals received via the target wireless channel and the additional wireless channels to first and second threshold values, the first and second threshold values being dynamic values based on factors selected from: relationships between strengths of signals received via the at least two additional wireless channels associated with the target wireless channel and a geographic location;
   calculating a score for further evaluation of the usability algorithm by:
      multiplying the identified received signal strength associated with the target wireless channel by a weighting factor to form a weighted result,
      adding the strengths of the signals received via the at least two additional wireless channels to form an added result, and
      adding the weighted result to the added result to form the score;
   associating the score with the target wireless channel;
   identifying the target wireless channel having the lowest associated score to be the best usable wireless channel to transmit the media signal; and
   when the target wireless channel is deemed to be usable to transmit the media signal, transmitting the media signal via the target wireless channel.

2. The non-transitory computer-readable storage medium according to claim 1, wherein the step of automatically identifying different target wireless channels comprises identifying all possible target wireless channels from among the number of wireless channels.

3. The non-transitory computer-readable storage medium according to claim 1, wherein the step of automatically identifying different target wireless channels comprises:
   defining a number of subsets of wireless channels from among the number of wireless channels, the subsets selected based on criteria from the group comprising: frequency sub-band information; user-input information; predetermined information; and historical information from evaluation of the channel acceptability algorithm, and
   identifying target wireless channels from among the defined subsets of wireless channels.

4. The non-transitory computer-readable storage medium according to claim 1, further comprising:
   identifying a particular target wireless channel identified as not being usable to transmit the media signal; and
   within a predetermined time period after the particular target wireless channel has been identified as not being usable to transmit the media signal, not including the particular target wireless channel among the number of wireless channels from which different target wireless channels are identified.

5. The non-transitory computer-readable storage medium according to claim 1, wherein the method further comprises:
   calculating a weighted average of the identified received signal strengths associated with the target wireless channel and the at least two additional wireless channels,
   identifying the target wireless channel having the lowest weighted average, and
   identifying the target wireless channel having the lowest weighted average to be the best usable wireless channel.

6. The non-transitory computer-readable storage medium according to claim 1, wherein the first and second threshold signal strength values are dynamic values based on factors selected from the group comprising: relationships between strengths of signals received via the at least two different additional wireless channels associated with particular different target wireless channels; and geographic location, and
   the relationships are based on factors selected from the group comprising: maximum received signal strengths; minimum received signal strengths; average received signal strengths; and root-mean-square average received signal strengths.

7. The non-transitory computer-readable storage medium according to claim 1, wherein the first and second threshold signal strength values are the same values.

8. The non-transitory computer-readable storage medium according to claim 1, wherein the method further comprises:
   arranging to provide information to a user, the information selected from the group comprising: identification of the target wireless channel; an indication of the usability of the target wireless channel; an indication of a quality of the target wireless channel; user selection options for a different target wireless channel from among the number of wireless channels; and information associated with the personal media player.

9. The non-transitory computer-readable storage medium according to claim 8, wherein the information is provided to the user via an electronic device selected from the group comprising: the personal media player; and an electronic device separate from the personal media player.

10. The non-transitory computer-readable storage medium according to claim 1, wherein the processor is in one of: the personal media player and an electronic device separate from the personal media player.

11. The non-transitory computer-readable storage medium according to claim 10, wherein the media signal transmitted via the wireless channel is playable by the electronic device.

12. A method for wirelessly transmitting a media signal originating from a personal media player, the method comprising:
   identifying a target wireless channel from among a number of wireless, wherein the number of wireless channels are non-blacklisted channels based on one of: a predetermined time period, a frequency band pass, and a predetermined geographic location;
identifying at least two additional wireless channels within a predetermined proximity of the target wireless channel;
receiving a signal via the target wireless channel;
receiving signals via each of the at least two additional wireless channels;
measuring a characteristic of the signal received via the target wireless channel;
measuring characteristics of the signals received via each of the at least two additional wireless channels;
arranging for evaluation of a channel usability algorithm based on the measured characteristic of the signal received via the target wireless channel and measured characteristics of the signals received via each of the at least two additional wireless channels, whether the target wireless channel is deemed to be usable to transmit the media signal, wherein the channel usability algorithm compares the measured characteristics of the signals received via the target wireless channel and the additional wireless channels to first and second threshold values, the first and second threshold values being dynamic values based on factors selected from: relationships between strengths of signals received via the at least two additional wireless channels associated with the target wireless channel and a geographic location;
calculating a score for further evaluation of the usability algorithm by:
multiplying the identified received signal strength associated with the target wireless channel by a weighting factor to form a weighted result,
adding the strengths of the signals received via the at least two additional wireless channels to form an added result, and
adding the weighted result to the added result to form the score;
associating the score with the target wireless channel;
identifying the target wireless channel having the lowest associated score to be the best usable wireless channel; and
when the target wireless channel is deemed to be usable to transmit the media signal, transmitting the media signal via the target wireless channel.

13. An electronic device, comprising:
a transmitter for transmitting a media signal;
a computer-readable storage medium; and
a processor responsive to the computer-readable storage medium and to a computer program, the computer program, when loaded into the processor, performing actions including:
arranging for identification of a target wireless channel from among a number of wireless channels, wherein the number of wireless channels are non-blacklisted channels based on one of: a predetermined time period, a frequency band pass, and a predetermined geographic location,
arranging for evaluation of a channel usability algorithm based on a measured characteristic of a signal received via the target wireless channel and measured characteristics of signals received via each of at least two additional wireless channels within a predetermined proximity of the target wireless channel, whether the target wireless channel is deemed to be usable to transmit the media signal, wherein the channel usability algorithm compares the measured characteristics of the signals received via the target wireless channel and the additional wireless channels to first and second threshold values, the first and second threshold values being selected such that a variability of radio receiver sensitivity and geographic locality is compensated by scaling one of maximum, average, and root mean square average values of previously measured received signal strengths on neighboring channels,
calculating a score for further evaluation of the usability algorithm by:
multiplying the identified received signal strength associated with the target wireless channel by a weighting factor to form a weighted result,
adding the strengths of the signals received via the at least two additional wireless channels to form an added result, and
adding the weighted result to the added result to form the score;
associating the score with the target wireless channel;
identifying the target wireless channel having the lowest associated score to be the best usable wireless channel; and
when the target wireless channel is deemed to be usable to transmit the media signal, arranging for the transmitter to transmit the media signal via the target wireless channel.

14. The electronic device according to claim 13, wherein the electronic device is selected from the group comprising: a digital camera; a personal digital assistant; an in-vehicle media player; a home media player; a mobile phone; a personal computer; and a portable media player.

* * * * *